(12) United States Patent
Klein et al.

(10) Patent No.: US 10,299,343 B2
(45) Date of Patent: May 21, 2019

(54) EXTERIOR AIRCRAFT LIGHT UNIT AND METHOD OF DISABLING A LIGHT OUTPUT OF AN EXTERIOR AIRCRAFT LIGHT UNIT

(71) Applicant: Goodrich Lighting Systems GmbH, Lippstadt (DE)

(72) Inventors: Frank Klein, Langenberg (DE); Andre Hessling-Von Heimendahl, Koblenz (DE); Robert Trinschek, Hamm (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/705,517

(22) Filed: Sep. 15, 2017

(65) Prior Publication Data

US 2018/0084620 A1 Mar. 22, 2018

(30) Foreign Application Priority Data

Sep. 16, 2016 (EP) ..................................... 16189341

(51) Int. Cl.
*H05B 33/00* (2006.01)
*H05B 33/08* (2006.01)
(Continued)

(52) U.S. Cl.
CPC ......... *H05B 33/0893* (2013.01); *B64D 47/02* (2013.01); *B64D 47/06* (2013.01);
(Continued)

(58) Field of Classification Search
CPC ................ H05B 33/0893; H05B 37/03; H05B 33/0818; H05B 33/0854; H05B 33/0803;
(Continued)

(56) References Cited

U.S. PATENT DOCUMENTS

| 7,391,335 B2 | 6/2008 | Mubaslat et al. |
| 8,773,044 B2 | 7/2014 | Hessling |

(Continued)

FOREIGN PATENT DOCUMENTS

| DE | 20220900 U1 | 5/2004 |
| EP | 2273850 A2 | 1/2011 |

(Continued)

OTHER PUBLICATIONS

Extended European Search Report for International Application No. 16189341.7 dated Mar. 8, 2017, 10 pages.

*Primary Examiner* — Monica C King
(74) *Attorney, Agent, or Firm* — Cantor Colburn LLP

(57) ABSTRACT

An exterior aircraft light unit includes a power input coupleable to an aircraft on-board power supply; at least one LED coupled to the power input for receiving power from the aircraft on-board power supply and configured to emit a light output; an optical sensor arranged for sensing an intensity detection portion of the light output and configured to output a detection signal indicative of an intensity level of the light output; an end of life detector, coupled to the optical sensor for receiving the detection signal and configured to determine an end of life condition; and a fuse circuit coupled to the end of life detector; wherein the fuse circuit is configured to irreversibly disable an LED circuit board upon the end of life detector communicating the end of life condition to the fuse circuit.

13 Claims, 4 Drawing Sheets

(51) Int. Cl.
  *B64D 47/06* (2006.01)
  *B64D 47/02* (2006.01)
  *H05B 37/03* (2006.01)
  *F21V 5/08* (2006.01)
  *F21W 107/30* (2018.01)

(52) U.S. Cl.
  CPC ......... *H05B 33/0848* (2013.01); *H05B 37/03* (2013.01); *B64D 2203/00* (2013.01); *F21V 5/08* (2013.01); *F21W 2107/30* (2018.01)

(58) Field of Classification Search
  CPC ............ H05B 33/0851; H05B 33/0857; H05B 33/0866; H05B 33/0821; H05B 37/02
  See application file for complete search history.

(56) References Cited

U.S. PATENT DOCUMENTS

| | | |
|---|---|---|
| 8,974,097 B2 | 3/2015 | Hessling et al. |
| 9,212,953 B2 | 12/2015 | Ruknudeen et al. |
| 9,258,871 B2 | 2/2016 | Mueller |
| 2006/0249663 A1 | 11/2006 | Ewig et al. |
| 2011/0115383 A1* | 5/2011 | Tyson, III .......... H05B 33/0893 315/120 |
| 2015/0054410 A1 | 2/2015 | Sanders et al. |
| 2016/0153832 A1 | 6/2016 | Lendaro |

FOREIGN PATENT DOCUMENTS

| | | |
|---|---|---|
| EP | 2607238 A1 | 6/2013 |
| WO | 2016050521 A1 | 4/2016 |

* cited by examiner

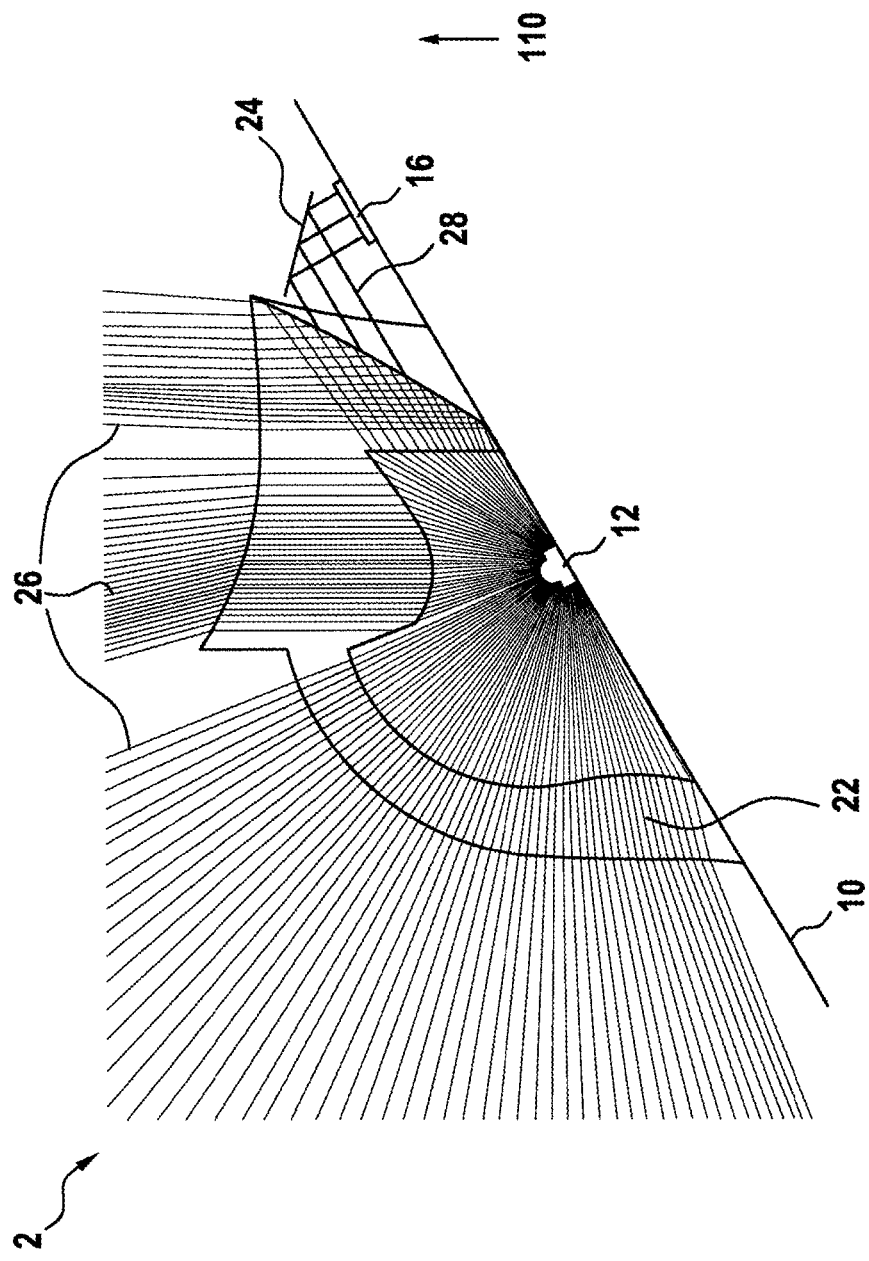

EXTERIOR AIRCRAFT LIGHT UNIT AND METHOD OF DISABLING A LIGHT OUTPUT OF AN EXTERIOR AIRCRAFT LIGHT UNIT

FOREIGN PRIORITY

This application claims priority to European Patent Application No. 16189341.7 filed Sep. 16, 2016, the entire contents of which is incorporated herein by reference.

TECHNICAL FIELD

The present invention is in the field of exterior aircraft lighting. In particular, the present invention is in the field of exterior aircraft light units that rely on LEDs as light sources and that monitor the aging behavior of those LEDs.

Almost all aircraft are equipped with exterior light units. In particular, exterior aircraft light units are provided for various purposes. On the one hand, exterior aircraft light units are provided for passive visibility, such as navigation light units, white flashing anti-collision light units, red flashing beacon light units, etc. On the other hand, exterior aircraft light units are provided for active visibility, such as airplane landing, take-off, taxi and runway turn-off light units or helicopter search light units. Also, various other lighting functionalities may be implemented. Further light units include engine and/or wing scan light units, cargo light units, logo light units, etc. In recent developments, more and more of the exterior aircraft light units rely on LED technology. While LEDs are efficient and long-lasting light sources, their output light intensity degrades over time, which is also referred to as aging of the LEDs. This degradation of the light intensity of the LEDs leads to an insufficient output light intensity of the exterior aircraft light unit in question.

Accordingly, it would be beneficial to provide an exterior aircraft light unit that addresses the issue of LED aging in a beneficial manner. Also, it would be beneficial to provide an aircraft having such exterior aircraft light unit(s).

SUMMARY

Exemplary embodiments of the invention include an exterior aircraft light unit, comprising a power input coupleable to an aircraft on-board power supply; at least one LED coupled to the power input for receiving power from the aircraft on-board power supply and configured to emit a light output; an optical sensor arranged for sensing an intensity detection portion of the light output and configured to output a detection signal indicative of an intensity level of the light output; an end of life detector, coupled to the optical sensor for receiving the detection signal and configured to determine an end of life condition; and a fuse circuit coupled to the end of life detector; wherein the at least one LED and the fuse circuit are arranged on an LED circuit board and wherein the fuse circuit is configured to irreversibly disable the LED circuit board upon the end of life detector communicating the end of life condition to the fuse circuit.

Exemplary embodiments of the invention allow for deliberately and irreversibly taking the exterior aircraft light unit out of service when the light output of the exterior aircraft light unit no longer satisfies the given requirements due to aging of the LED(s). In this way, it is made sure that the degradation is noticed during inspection of the aircraft, because the exterior aircraft light unit is completely off. In previous approaches, the degradation below the given requirements may have stayed un-noticed, because the falling of the light output below the given requirements is not readily discernible by maintenance personnel upon observing the exterior aircraft light unit in operation. Also, as compared to prior approaches involving an alert-based system, the irreversible disabling of the LED circuit board in accordance with exemplary embodiments of the invention is more prone to being noticed. In particular prior approaches, the detection of the end of life condition was signalled by the illumination of an alert LED in the exterior aircraft light unit or by the generation of an according alert signal towards the board computer or towards a maintenance computer, while the exterior aircraft light unit stayed in service. As compared to these alert-based systems, where the alert may be overlooked or ignored and the exterior aircraft light unit may be operated below its light output requirements, exemplary embodiments of the invention ensure that the degradation of the LED(s) does not stay un-noticed and that the exterior aircraft light unit is not operated below the light output requirements.

By irreversibly disabling the LED circuit board, it is ensured that the exterior aircraft light unit is not inadvertently or deliberately put back into service despite the inacceptable LED degradation, before proper maintenance is carried out. In this way, the extended use of exterior aircraft light units with light output below the given light output requirements is reliably prevented, enhancing flight safety. Exemplary embodiments of the invention make use of the fact that aircraft are in generally allowed to stay in service for a limited amount of time despite a completely broken exterior aircraft light unit. Accordingly, exemplary embodiments of the invention ensure a noticing of the end of life condition of the exterior aircraft light unit and a speedy maintenance, while not leading to an immediate grounding of the aircraft.

The fuse circuit is configured to irreversibly disable the LED circuit board upon the end of life detector communicating the end of the life condition to the fuse circuit. The irreversible disabling of the LED circuit board may also be referred to as a permanent disabling of the LED circuit board. This irreversible or permanent disabling of the LED circuit board is of such kind that the LED circuit board cannot be put back into service by the exterior aircraft light unit, neither by the generation of internal commands within the exterior aircraft light unit nor by the application of external commands conveyed to the exterior aircraft light unit. The irreversible disabling of the LED circuit board is of such kind that a replacement LED circuit board is to be installed into the exterior aircraft light unit, in order to put the same back into service. It is also possible to remove the LED circuit board from the exterior aircraft light unit, to re-condition the LED circuit board and to insert the same, re-conditioned LED circuit board into the exterior aircraft light unit for putting the same back into service.

The at least one LED and the fuse circuit are arranged on the LED circuit board. This means that the power and data communication connections to and from the LED(s) and the fuse circuit are implemented via the LED circuit board. In particular, the power supply and communication lines run on the LED circuit board. The LED circuit board may be a printed circuit board.

The light output of the at least one LED may have a useful light output portion, which actually leaves the exterior aircraft light unit and contributes to the desired output light intensity distribution of the exterior aircraft light unit, and a non-useful light output portion, which is lost or blocked somewhere within the exterior aircraft light unit or which leaves the exterior aircraft light unit as stray light outside of the desired output light intensity distribution. By definition, the intensity detection portion of the light output, which is sensed by the optical sensor, is part of the non-useful light output portion, because it is absorbed before leaving the exterior aircraft light unit. It is possible that the intensity detection portion of the light output is light that would otherwise leave the exterior aircraft light unit as stray light. In this way, the optical sensor does not take away any light from the useful light output portion and does not negatively impact the efficiency of the exterior aircraft light unit.

According to a further embodiment, the fuse circuit is configured to irreversibly disable power reception at the LED circuit board. Disabling power reception all together is a reliable way of taking the LED(s) out of operation with low complexity. However, various other ways of disabling the LED circuit board are possible as well. For example, the fuse circuit may be a logic circuit that controls an according shut down operation of the LED circuit board, although the other circuit elements still receive power.

According to a further embodiment, the fuse circuit comprises a one time settable latch. In other words, the fuse circuit may comprise a bi-stable circuit element, such as a flipflop or latch, which has a normal operating state and an end of life operating state. The transition from the normal operating state to the end of life operating state may be made only once. The one time settable latch can also be described as a non-resettable latch. Via its output, this one time settable latch takes the LED circuit board out of operation.

According to a further embodiment, the end of life detector is configured to determine the end of life condition if the detection signal indicates that the intensity level of the light output is below a set threshold value. In other words, the end of life detector may base its determination of the end of life condition on an end of life criterion. This end of life criterion may be a comparison between the momentary intensity level of the light output and the set threshold value for the light output. In this way, the irreversible disabling of the LED circuit board may be carried out on the actual, sensed light output of the at least one LED. The set threshold value may be a preset or predetermined threshold value. In particular, it may be a fixed threshold value that is not changeable, e.g. a hard-coded threshold value in the end of life detector. It is also possible that the set threshold value is a selected threshold value. In particular, a suitable threshold value for the exterior aircraft light unit in question may be selected during production thereof. It is also possible that a suitable threshold value may be selected during maintenance, e.g. set by maintenance personnel, or may be selected via according control commands from the cockpit/board computer.

According to a further embodiment, the end of life detector comprises a timer circuit and the end of life detector is configured to determine the end of life condition if the detection signal indicates that the intensity level of the light output is below the set threshold value for a set time interval. In other words, the criterion for an irreversible disabling of the LED circuit board is that the intensity level of the light output is below the set threshold value for a set time interval. In this way, the LED circuit board is only irreversibly disabled if the light intensity of the exterior aircraft light unit is below a required/desired threshold for an extended period of time. In this way, an inadvertent irreversible disabling of the LED circuit board, such as due to a momentary erroneous operation of the optical sensor, may be prevented. The set time interval may be a preset or predetermined value. In particular, it may be a fixed value that is not changeable, e.g. a hard-coded value in the end of life detector. It is also possible that the set time interval is a selected time interval. In particular, a suitable time interval for the exterior aircraft light unit in question may be selected during production thereof. It is also possible that a suitable time interval may be selected during maintenance, e.g. set by maintenance personnel or may be selected via according control commands from the cockpit/board computer.

According to a further embodiment, the exterior aircraft light unit further comprises a temperature sensing circuit configured to sense an operating temperature of the at least one LED, wherein the temperature sensing circuit is coupled to the end of life detector and wherein the end of life detector is configured to determine the end of life condition only if the operating temperature of the at least one LED, sensed by the temperature sensing circuit, is below a normal operating threshold value. In this way, the criterion for detecting the end of life condition includes a further condition. In particular, the end of life condition may only be detected if the operating temperature of the at least one LED is not excessively high. In yet other words, the detection of a low light intensity level of the light output may be disregarded if the operating temperature of the at least one LED is too high. In this way, a temporary degradation of the light output of the exterior aircraft light unit due to high temperatures, which may be caused by a temporary lack of cooling of the exterior aircraft light unit, such as when the exterior aircraft light unit is covered by a cloth or other covering during maintenance, may be prevented from resulting in an inadvertent irreversible disabling of the LED circuit board. The expression of the temperature sensing circuit sensing an operating temperature of the at least one LED includes the sensing of a temperature in the vicinity of the at least one LED that is indicative of the operating temperature of the at least one LED or the sensing of any other temperature that is indicative of the operating temperature of the at least one LED.

According to a further embodiment, the temperature sensing circuit is arranged on the LED circuit board. In this way, the temperature sensing circuit may be arranged in close vicinity to the at least one LED, allowing for particularly accurate temperature sensing. The arrangement of the temperature sensing circuit on the LED circuit board may allow for a high integration of components and may allow for a joint taking out of service of multiple components at the same time.

According to a further embodiment, the optical sensor is arranged on the LED circuit board. In this way, the optical sensor is provided in close vicinity to the at least one LED, allowing for particularly accurate measurements of the intensity level of the light output. Also, a high integration of the components may be achieved and the optical sensor may be taken out of operation at the same time as the at least one LED with no or low additional complexity.

According to a further embodiment, the exterior aircraft light unit further comprises a time of use recorder configured to record an aggregate operation time of the at least one LED, wherein the time of use recorder is coupled to the end of life detector and is configured to communicate the aggregate operation time to the end of life detector. In this way, the aggregate operation time of the at least one LED at the determination of the end of life condition can be determined by the end of life detector. This aggregate operation time may be read out during replacement of the LED circuit board, which allows the maintenance personal to determine if the aging of the LED(s) happened within an expected time frame or not. This in turn may allow the maintenance personnel to deduce potential further faults of the exterior aircraft light unit and/or to make structural changes to the exterior aircraft light unit/replace the whole exterior aircraft light unit with a different one.

According to a further embodiment, the time of use recorder is arranged on the LED circuit board. In this way, a high integration of components may be achieved, and the time of use recorder may be taken out of service at the detection of the end of life condition with no or low additional complexity. As the aggregate operation time may be communicated to the end of life detector, the aggregate operation time may still be accessible after the irreversible disabling of the LED circuit board.

According to a further embodiment, the end of life detector is not arranged on the LED circuit board. Rather, it is provided as a separate component and may be coupled to the optical sensor, the fuse circuit, the temperature sensing circuit, and the time of use recorder via the LED circuit board.

According to a further embodiment, the exterior aircraft light unit comprises a power conditioning and control module, with the at least one LED being coupled to the aircraft on-board power supply via the power conditioning and control module. The power conditioning and control module may receive power from the aircraft on-board power supply and provide a suitable current to the at least one LED. Also, it may be configured to provide said current only when receiving an according on-command, e.g. from the cockpit or from a board computer. For this purpose, the power conditioning and control module may comprise an LED driver circuit. The power conditioning and control module may further comprise an electromagnetic interference filter and a power factor correction circuit. Further, the power conditioning and control module may further comprise an auxiliary power circuit, which provides power to the end of life detector. Yet further, the power conditioning and control module may also provide power to other components on the LED circuit board/to the LED circuit board as a whole.

According to a further embodiment, the aircraft on-board power supply is a 115 V/400 Hz on-board power distribution network.

Exemplary embodiments of the invention further include an LED circuit board for use in an exterior aircraft light unit, wherein the LED circuit board is coupleable to a power input for receiving power from an aircraft on-board power supply, and wherein the LED circuit board comprises at least one LED configured to emit a light output, and a fuse circuit configured to irreversibly disable the LED circuit board upon receiving an end of life condition signal indicating an end of life condition of the at least one LED. The modifications, additional features and effects described above with respect to the LED circuit board in the context of the exterior aircraft light unit are applicable to the LED circuit board in an analogous manner.

According to a further embodiment, the LED circuit board is coupleable to an end of life detector for receiving the end of life condition signal. It is also possible that the LED circuit board comprises an end of life detector, configured to generate the end of life condition signal.

The fuse circuit may generally be configured to allow a normal operation upon an initial start-up of the LED circuit board. In particular, the fuse circuit may be configured to allow the normal operation upon being inserted into the exterior aircraft light unit and being powered up for the first time. In this way, by inserting a replacement LED circuit board into the exterior aircraft light unit, the exterior aircraft light unit may be reset and ready to use. In other words, the insertion of a replacement LED circuit board may render the exterior aircraft light unit reset. Again, once the fuse circuit has irreversibly disabled the LED circuit board, the exterior aircraft light unit may not be reset via control commands, but only via replacement of the LED circuit board.

Exemplary embodiments of the invention further include an aircraft comprising an on-board power supply and at least one exterior aircraft light unit, as described in any of the embodiments above, coupled to the on-board power supply, wherein the at least one exterior aircraft light unit is arranged in an outer portion of the aircraft for lighting an outside environment of the aircraft. The aircraft may be an airplane or a helicopter. The exterior aircraft light unit(s) may be any kind of exterior aircraft light unit(s) present on an airplane or helicopter. The modifications, additional features and effects described above with respect to the exterior aircraft light unit are applicable to the aircraft in an analogous manner.

Exemplary embodiments of the invention further include a method of disabling a light output of an exterior aircraft light unit upon detection of an end of life condition, with the exterior aircraft light unit having at least one LED arranged on an LED circuit board, the method comprising the steps of: operating the at least one LED for emitting the light output; sensing an intensity level of the light output; determining the end of life condition on the basis of the intensity level of the light output; and irreversibly disabling the LED circuit board upon determining the end of life condition. The modifications, additional features and effects described above with respect to the exterior aircraft light unit are applicable to the method of disabling the light output of the exterior aircraft light unit in an analogous manner.

According to a further embodiment, the step of determining the end of life condition comprises determining the end of life condition if the intensity level of the light output is below a set threshold value for a set time interval.

According to a further embodiment, the step of determining the end of life condition comprises sensing an operating temperature of the at least one LED, and determining the end of life condition only if the operating temperature of the at least one LED is below a normal operation threshold value.

Exemplary embodiments of the invention further include a method of maintaining an exterior aircraft light unit, comprising disabling the light output of the exterior aircraft light unit, as described in any of the embodiments above, and replacing the LED circuit board with a replacement LED circuit board comprising at least one replacement LED.

BRIEF DESCRIPTION OF THE FIGURES

Further exemplary embodiments of the invention are described in detail with respect to the accompanying figures, wherein:

FIG. 4 shows selected components of an exterior aircraft light unit in accordance with an exemplary embodiment of the invention in a cross-sectional view.

DETAILED DESCRIPTION

Figure 1:
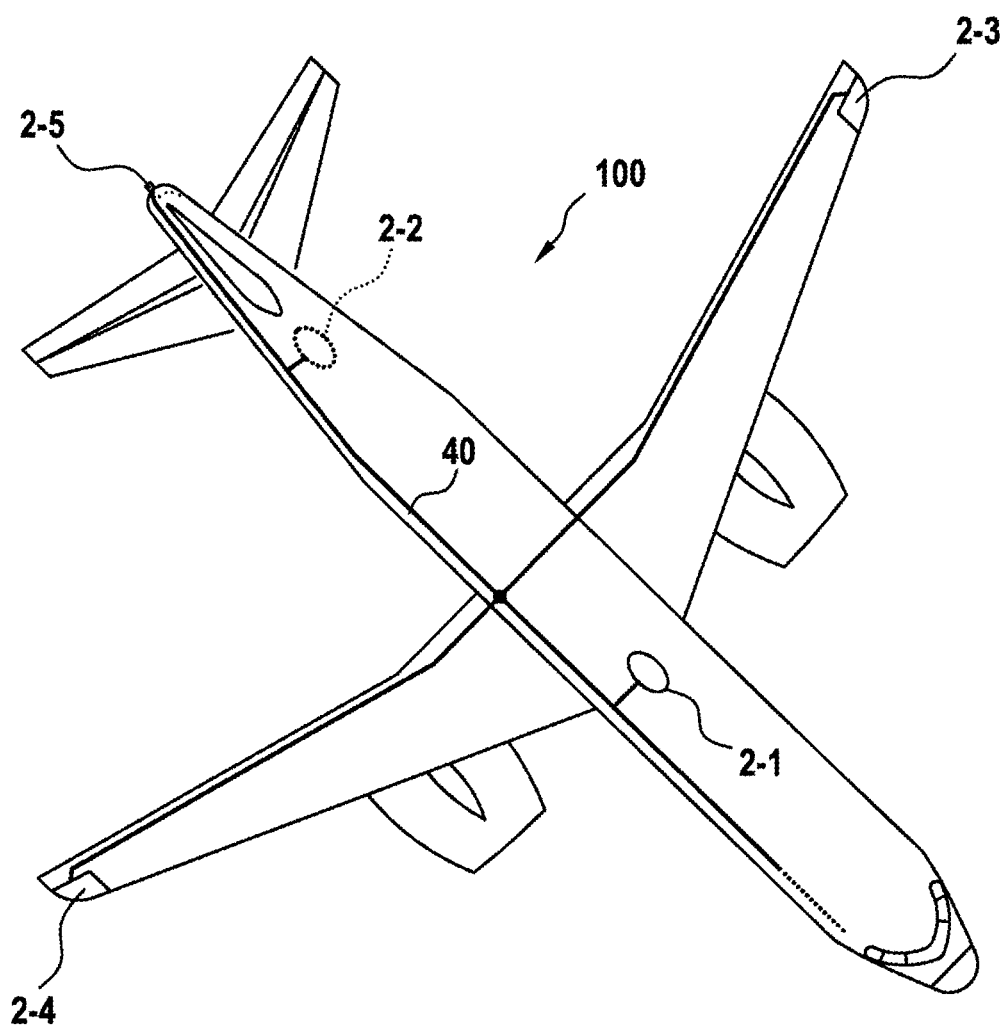
FIG. 1 shows an aircraft in accordance with an exemplary embodiment of the invention in a top view, the aircraft being equipped with a plurality of exterior aircraft light units in accordance with exemplary embodiments of the invention.

FIG. 1 shows an aircraft 100 in accordance with an exemplary embodiment of the invention in a top view. The aircraft 100 of FIG. 1 is a large commercial airplane, such as a passenger airplane or a cargo airplane. The aircraft 100 has an aircraft on-board power supply 40. The on-board power supply 40 is a power supply network that provides power to a variety of different devices in the aircraft 100. For illustrative purposes, the aircraft on-board power supply 40 is depicted as a set of power lines running along the fuselage of the aircraft 100 and running along the wings of the aircraft 100. The aircraft on-board power supply 40 is a 115 V/400 Hz power distribution network in the exemplary embodiment of FIG. 1.

The aircraft 100 has a plurality of exterior aircraft light units in accordance with exemplary embodiments of the invention. For illustrative purposes, five exterior aircraft light units are depicted in FIG. 1. In particular, the aircraft 100 has an upper beacon light unit 2-1, which is mounted to the top of the fuselage of the aircraft 100, a lower beacon light unit 2-2, which is mounted to the bottom portion of the fuselage of the aircraft 100, a left wing tip navigation light unit 2-3, which is mounted to the wing tip of the left wing of the aircraft 100, a right wing tip navigation light unit 2-4, which is mounted to the wing tip of the right wing of the aircraft, and a tail navigation light unit 2-5, which is mounted to the tail of the fuselage of the aircraft 100. It is understood that these exterior aircraft light units are exemplary in nature and that the aircraft 100 may have various further exterior aircraft light units, such as white flashing anti-collision light units, wing and engine scan light units, take-off, landing, taxiing and runway turn-off light units, logo light units, etc.

Figure 2:
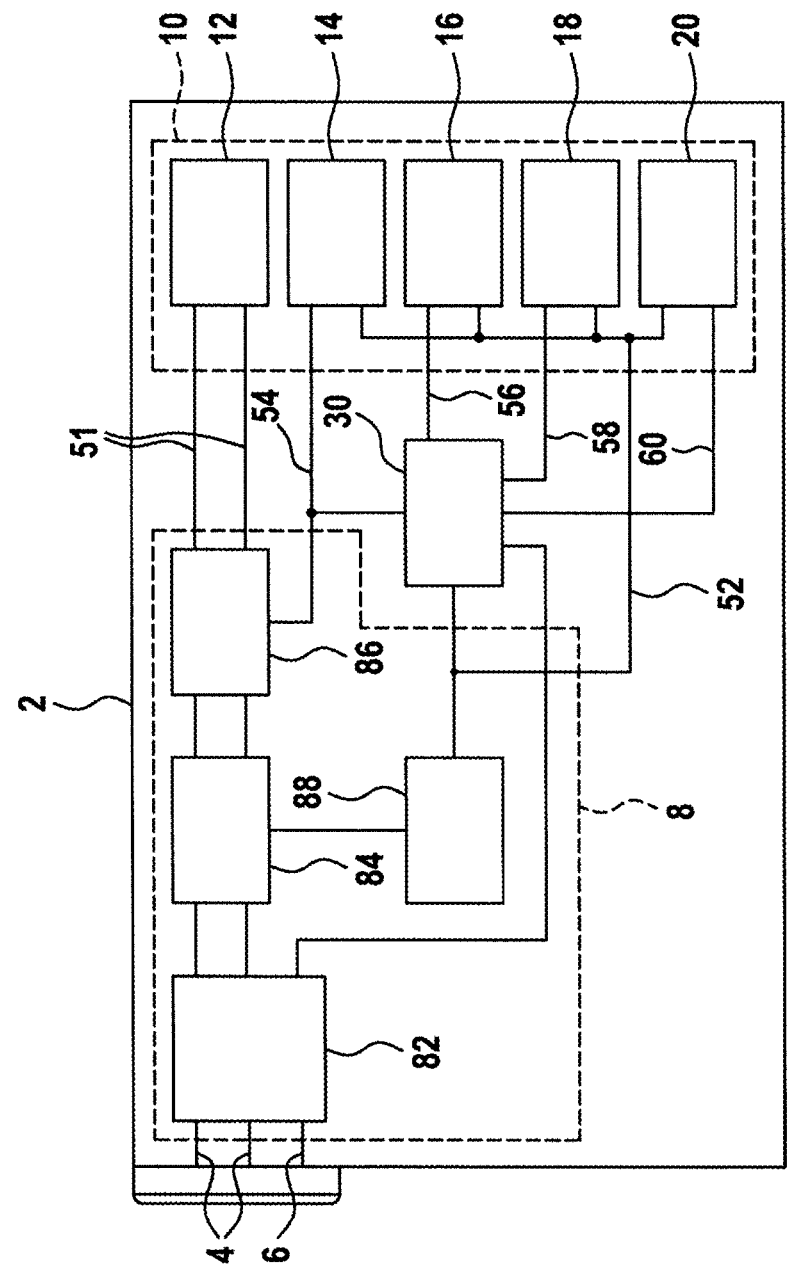
FIG. 2 shows a block diagram of an exterior aircraft light unit in accordance with an exemplary embodiment of the invention.

FIG. 2 shows an exterior aircraft light unit 2 in accordance with an exemplary embodiment of the invention in a block diagram. The general structure and working principle of the exterior aircraft light unit 2, which will be described below, may be applied to all of the five illustrated exterior aircraft light units of FIG. 1 as well as to other exterior aircraft light units, as described above.

The exterior aircraft light unit 2 has a power input 4, consisting of two power lines, for coupling the exterior aircraft light unit 2 to the aircraft on-board power supply 40, as illustrated in FIG. 1. Further, the exterior aircraft light unit 2 has a communication terminal 6 for exchanging data with the remainder of the aircraft, such as for exchanging data with the board computer of the aircraft.

The exterior aircraft light unit 2 has a power conditioning and control module 8. The power conditioning and control module 8 in turn comprises a power input and communication filter 82, which may include an electromagnetic interference filter, a power factor correction circuit 84, an LED driver circuit 86, and an auxiliary power circuit 88.

The exterior aircraft light unit 2 further comprises an LED circuit board 10. Arranged on the LED circuit board 10, there are provided an LED chain 12, a temperature sensing circuit 14, an optical sensor 16, a fuse circuit 18, and a time of use recorder 20. Yet further, the exterior aircraft light unit 2 comprises an end of life detector 30.

Above mentioned components are coupled to each other as follows. The power input 4 is coupled to the power input and communication filter 82, which in turn is coupled to the power factor correction circuit 84 via two power lines, which in turn is coupled to the LED driver circuit 86 via two power lines. Further, the power input and communication filter 82 is coupled to the communication terminal 6 for exchanging data with the outside of the exterior aircraft light unit 2. Also, the power input and communication filter 82 is coupled to the end of life detector 30 via a communication line for receiving status information about the end of life condition of the exterior aircraft light unit 2.

The power factor correction circuit 84 is coupled to the auxiliary power circuit 88 via a power line. Further, the auxiliary power circuit 88 is coupled to the end of life detector 30 as well as to the temperature sensing circuit 14, the optical sensor 16, the fuse circuit 18, and the time of use recorder 20 via an auxiliary power distribution network 52.

The LED driver circuit 86 is coupled to the LED chain 12 via two LED power lines 51. The LED driver circuit 86 is further coupled to the temperature sensing circuit 14 and the end of life detector 30 via a temperature communication line 54. The end of life detector 30 is further coupled to the optical sensor 16 via an intensity communication line 56. The end of life detector 30 is further coupled to the fuse circuit 18 via an end of life communication line 58. The end of life detector 30 is further coupled to the time of use recorder 20 via a time of use communication line 60.

The operation of the exterior aircraft light unit 2 is described as follows. Upon the reception of an according on-command over communication terminal 6, the LED chain 12 is provided with power from the aircraft on-board power supply for emitting a light output. In particular, the power input and communication filter 82, the power factor correction circuit 84, and the LED driver circuit 86 provide power to the LED chain 12 in a suitable form. Further in particular, said power is filtered for electromagnetic interference by the power input and communication filter 82, is power factor corrected in the power factor correction circuit 84, and is conditioned to a suitable current level in the LED driver circuit 86. Further, operating power is provided to the end of life detector 30, to the temperature sensing circuit 14, to the optical sensor 16, to the fuse circuit 18, and to the time of use recorder 20 via the auxiliary power circuit 88.

During normal operation of the exterior aircraft light unit 2, the LED chain 12 constantly emits the light output for lighting an outside environment of the aircraft. At the same time, the temperature sensing circuit 14 senses a temperature indicative of the operating temperature of the LED chain 12. Further at the same time, the optical sensor 16 senses an intensity level of the light output by sensing an intensity detection portion of the light output of the LED chain 12. Further at the same time, the end of life detector 30 continuously compares said intensity level of the light output to a set threshold value. Yet further at the same time, the time of use recorder 20 continuously counts the operating time of the LED chain 12. After the exterior aircraft light unit 2 is shut down and re-started, the time of use recorder 20 starts its counting operation at the value of the previous shut-down, such that an aggregate operation time is counted by the time of use recorder 20. The time of use recorder 20 continuously or periodically communicates the aggregate operation time to the end of life detector 30 via the time of use communication line 60.

In the exemplary embodiment of FIG. 2, the temperature sensing circuit 14 continuously communicates the operating temperature of the LED chain 12 to the end of life detector 30 and to the LED driver circuit 86 via the temperature communication line 54. The LED driver circuit 86 is configured to adapt the current provided to the LED chain 12 via the LED power lines 51 depending on the operating temperature. In this way, a temperature-compensated operation of the LED chain 12 may be achieved, which allows for a constant light output, as long as the aging of the LED aging does not become significant. It is also possible to actively decrease the current to the LED chain 12 at very high operating temperatures for self-protection.

Next, the operation of the exterior aircraft light unit 2 is described for the situation that the end of life detector 30 determines that the intensity level of the light output, as indicated by the signal from the optical sensor 16, is below the set threshold value. The set threshold value may be a percentage value of the normal light intensity of the exterior aircraft light unit, such as 50% of the original output light intensity upon going into service.

When the end of life detector 30 determines that the intensity level of the light output is below the set threshold value, it starts a timer circuit. This timer circuit, which may be set to a value somewhere between 10 s and 30 min, ensures that the intensity level must be below the set threshold value for the set time, in order for a further action to take place. In other words, the end of life detector 30 checks if the intensity level of the light output is below the set threshold value for the time set in the timer circuit. If the intensity level of the light output rises above the set threshold value, the timer is re-set and is re-started upon a subsequent falling of the intensity level below the set threshold value.

At the same time, the end of life detector 30 monitors the operating temperature of the LED chain 12, as provided by the temperature sensing circuit 14 via the temperature communication line 54. In particular, the end of life detector 30 compares the operating temperature to a normal operation threshold value. If the operating temperature is below the normal operation threshold value and the intensity level of the light output of the LED chain 12 is below the set threshold value for the set time interval set by the timer circuit, the end of life detector 30 determines an end of life condition. If the operating temperature is above the normal operation threshold value, no end of life condition is determined.

Upon determining an end of life condition, the end of life detector 30 communicates an according signal to the power input and communication filter 82 for communicating said end of life condition to the outside of the exterior aircraft light unit 2 via the communication terminal 6. Further, the end of life detector 30 signals the end of life condition to the fuse circuit 18 via the fuse communication line 58.

Upon receiving the signal indicating the end of life condition, the fuse circuit 18 irreversibly disables the LED circuit board 10. In particular, the fuse circuit 18 disables the operation of the LED chain 12, the temperature sensing circuit 14, the optical sensor 16, and the time of use recorder 20. In a particular embodiment, the fuse circuit 18 irreversibly interrupts the power lines 51 to the LED chain 12 as well as according portions of the auxiliary power distribution network 52 to the temperature sensing circuit 14, the end of life detector 16, and the time of use recorder 20. It is also possible that the fuse circuit 18 does not interrupt the power to these devices, but that it sends an according irreversible control signal to the respective control logics associated with these components.

The disabling of the LED circuit board 10 is permanent and cannot be reversed without replacing the LED circuit board 10. In particular, irrespective of what ensuing signal is provided on the fuse communication line 58, the fuse circuit 18 does not reverse its control action of disabling the LED circuit board 10.

The exterior aircraft light unit 2 may also be operated in a test mode to test the functioning of the end of life procedure without actually disabling the LED circuit board 10. In particular, it may be possible to interrupt the fuse communication line 58, to operate the LED driver circuit 86 to provide a current to the LED chain 12 that results in a light output with an intensity level below the set threshold value, and to monitor the signalling of the end of life condition by the end of life detector 30 to the power input and communication filter 82. It is also possible that an optical indicator is provided instead of/in addition to said signalling to the power input and communication filter 82. In this way, the functioning of the end of life determination may be tested, without irreversibly disabling the LED circuit board 10. It is also possible that the optical indicator, such as an indicator LED, lights up when the end of life detector 30 determines that the intensity level of the light output is below the set threshold value, irrespective of the operation of the associated timer circuit and the operating temperature monitoring. In this way, the functioning of the optical sensor 16 can be tested quickly without carrying out the full end of life procedure and without irreversibly disabling the LED circuit board 10.

Figure 3:
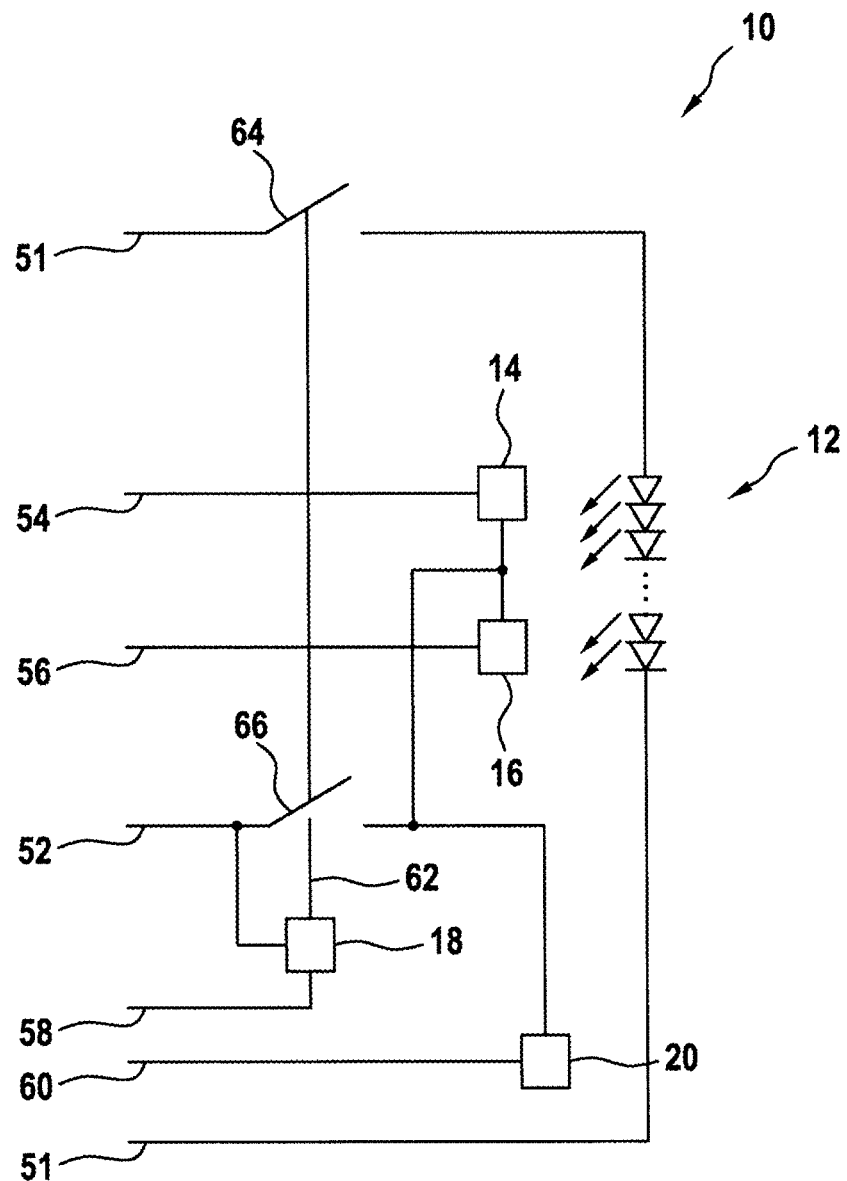
FIG. 3 shows a circuit diagram of an LED circuit board, with the LED circuit board being usable in exterior aircraft light units in accordance with exemplary embodiments of the invention.

FIG. 3 shows an exemplary circuit implementation of the LED circuit board 10 of FIG. 2. Out of the LED chain 12, five exemplary LEDs are shown. However, a greater or smaller number of LEDs may be provided in the exterior aircraft light unit 2. The operating temperature sensor 14 and the optical sensor 16 are provided in close proximity to the LED chain 12 for an accurate sensing of the operating temperature and the light intensity of the light output. The time of use recorder 20 may count the operating time whenever power is provided to it, assuming that the auxiliary power distribution network 52 is powered up at the same time as the LED power lines 51. It is also possible that the time of use recorder 20 comprises a sensor capable of detecting current flow in the adjacent LED power line 51 and records the time of said power flow.

The fuse circuit 18 has a disabling output 62. This disabling output 62 controls a first switch 64, arranged in one of the two LED power lines 51, as well as a second switch 66, arranged in the auxiliary power distribution network 52. By opening the first and second switches 64, 66, the power provision to the LED chain 12, the temperature sensing circuit 14, the optical sensor 16, and the time of use recorder 20 is interrupted. In FIG. 3, this state of power interruption is depicted. It is again pointed out that this state of power interruption, as depicted in FIG. 3, is not reversible. In other words, the fuse circuit 18 does not provide a command for closing the first and second switches 64, 66 again. In order to implement this functionality, the fuse circuit 18 may be a one time settable latch or flip-flop.

In order to bring the exterior aircraft light unit 2 back into service, the LED circuit board 10 is to be replaced with a new LED circuit board, having new LEDs whose light output is above the light output requirements.

FIG. 4 shows selected components of an exterior aircraft light unit 2 in accordance with an exemplary embodiment of the invention in a cross-sectional view. In particular, the LED circuit board 10 is shown, which carries a single LED 12 in the exemplary embodiment of FIG. 4. The single LED 12 is associated with a lens 22 that shapes a desired output light intensity distribution of the exterior aircraft light unit 2. In the exemplary embodiment of FIG. 4, the exterior aircraft light unit 2 is a forward navigation light unit, with arrow 110 indicating the forward direction of the aircraft. The light leaving the LED 12 is referred to as light output. The light leaving the lens 22 and contributing to the output light intensity distribution of the exterior aircraft light unit 2 is referred to as useful light output portion 26, illustrated by various exemplary light rays in FIG. 4.

Towards the right of the lens 22, a surface of total internal reflection is provided, which generates a strong output peak in the forward direction 110. However, this surface of total internal reflection is imperfect, such that few light rays exit the lens 22 there. These light rays are part of the non-useful light output portion of the exterior aircraft light unit 2. Further, these exemplary light rays form the intensity detection portion 28 of the light output in the exemplary embodiment of FIG. 4. The intensity detection portion 28 is redirected towards the optical sensor 16 by a reflector 24. As the intensity detection portion 28 is stray light that does not contribute to the useful light output of the exterior aircraft light unit 2, the intensity sensing by the optical sensor 16 does not hurt the overall efficiency of the exterior aircraft light unit 2.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light unit, comprising:
a power input coupleable to an aircraft on-board power supply,
at least one LED coupled to the power input for receiving power from the aircraft on-board power supply and configured to emit a light output,
an optical sensor arranged for sensing an intensity detection portion of the light output and configured to output a detection signal indicative of an intensity level of the light output,
an end of life detector, coupled to the optical sensor for receiving the detection signal and configured to determine an end of life condition, and
a fuse circuit coupled to the end of life detector,
wherein the at least one LED, the optical sensor and the fuse circuit are arranged on an LED circuit board and wherein the fuse circuit is configured to irreversibly disable power reception at the LED circuit board upon the end of life detector communicating the end of life condition to the fuse circuit.

2. The exterior aircraft light unit according to claim 1, wherein the fuse circuit comprises a one time settable latch.

3. The exterior aircraft light unit according to claim 1, wherein the end of life detector is configured to determine the end of life condition if the detection signal indicates that the intensity level of the light output is below a set threshold value.

4. The exterior aircraft light unit according to claim 3, wherein the end of life detector comprises a timer circuit and wherein the end of life detector is configured to determine the end of life condition if the detection signal indicates that the intensity level of the light output is below the set threshold value for a set time interval.

5. The exterior aircraft light unit according to claim 3, further comprising a temperature sensing circuit configured to sense an operating temperature of the at least one LED, wherein the temperature sensing circuit is coupled to the end of life detector and wherein the end of life detector is configured to determine the end of life condition only if the operating temperature of the at least one LED, sensed by the temperature sensing circuit, is below a normal operation threshold value.

6. The exterior aircraft light unit according to claim 5, wherein the temperature sensing circuit is arranged on the LED circuit board.

7. The exterior aircraft light unit according to claim 1, wherein the optical sensor is arranged on the LED circuit board.

8. The exterior aircraft light unit according to claim 1, further comprising a time of use recorder configured to record an aggregate operation time of the at least one LED, wherein the time of use recorder is coupled to the end of life detector and is configured to communicate the aggregate operation time to the end of life detector, with the time of use recorder in particular being arranged on the LED circuit board.

9. An LED circuit board for use in an exterior aircraft light unit, LED circuit board comprising:
at least one LED configured to emit a light output, and
an optical sensor arranged for sensing an intensity detection portion of the light output and configured to output a detection signal indicative of an intensity level of the light output; and
a fuse circuit configured to irreversibly disable power reception at the LED circuit board upon receiving an end of life condition signal indicating an end of life condition of the at least one LED;
wherein the LED circuit board is coupleable to a power input for receiving power from an aircraft on-board power supply.

10. The exterior aircraft light unit according to claim 1 in combination with a an aircraft that includes an on-board power supply coupled to the unit and wherein the one exterior aircraft light unit is arranged in an outer portion of the aircraft for lighting an outside environment of the aircraft.

11. A method of disabling a light output of an exterior aircraft light unit upon detection of an end of life condition, with the exterior aircraft light unit having at least one LED arranged on an LED circuit board, the method comprising:
operating the at least one LED for emitting the light output;
sensing an intensity level of the light output using an optical sensor which is arranged on the LED circuit board;
determining the end of life condition on the basis of the intensity level of the light output; and
irreversibly disabling power reception at the LED circuit board upon determining the end of life condition.

12. A method according to claim 11, wherein determining the end of life condition comprises determining the end of life condition if the intensity level of the light output is below a set threshold value for a set time interval.

13. A method according to claim 11, wherein the step of determining the end of life condition comprises:
sensing an operating temperature of the at least one LED; and
determining the end of life condition only if the operating temperature of the at least one LED is below a normal operation threshold value.

* * * * *